UNITED STATES PATENT OFFICE.

CHARLES JOHN POTTER, OF WILLINGTON QUAY, ENGLAND.

MANUFACTURE OF HYDRAULIC CEMENT.

No. 917,129.　　　　　Specification of Letters Patent.　　　Patented April 6, 1909.

Application filed November 12, 1908. Serial No. 462,197

*To all whom it may concern:*

Be it known that I, CHARLES JOHN POTTER, manufacturer, a subject of the King of Great Britain, residing at Tyne Cement Works, Willington Quay, in the county of Northumberland, England, have invented new and useful Improvements in the Manufacture of Hydraulic Cement, of which the following is a specification.

The object of this invention is to obtain a white hydraulic cement. For this purpose the presence of iron in the ingredients is avoided, they are burned with fuel free from iron and the clinker is cooled in a reducing atmosphere.

Preferably an intimate mixture of chalk, china clay and finely ground flint are burned preferably in a rotary kiln at a high temperature with a fuel free from iron such as tar, gas or oil. The clinker is then cooled in a reducing atmosphere such as coal gas.

In place of the above mentioned materials other forms of calcareous matter, clay and silica may be employed provided they are almost free from iron.

The proportions of the materials may be varied considerably but the mixture should contain from 60 to 70 per cent. of lime, 3 to 8 per cent. of alumina and 18 to 25 per cent. of silica and not more and preferably less than $\frac{1}{2}$ per cent. of iron.

What I claim is:—

1. In the manufacture of cement cooling the clinker in a reducing atmosphere.

2. The manufacture of cement by burning a mixture of calcareous matter, clay and silica all almost free from iron, with fuel also almost free from iron, and then cooling the resulting clinker in a reducing atmosphere.

CHARLES JOHN POTTER.

Witnesses:
　JAMES BROWN,
　JNO. D. CARP